United States Patent
Zhang

(10) Patent No.: US 10,716,082 B2
(45) Date of Patent: Jul. 14, 2020

(54) BLUETOOTH AUTOMATIC CONNECTION METHOD, AND MASTER DEVICE, SLAVE DEVICE, AND SYSTEM

(71) Applicant: Fujian LANDI Commercial Equipment Co., Ltd, Fujian (CN)

(72) Inventor: Chengbo Zhang, Fujian (CN)

(73) Assignee: Fujian LANDI Commercial Equipment Co., Ltd, Fujian (CN)

( * ) Notice: Subject to any disclaimer, the term of this patent is extended or adjusted under 35 U.S.C. 154(b) by 109 days.

(21) Appl. No.: 15/772,092

(22) PCT Filed: Aug. 3, 2016

(86) PCT No.: PCT/CN2016/093139
§ 371 (c)(1),
(2) Date: Apr. 30, 2018

(87) PCT Pub. No.: WO2017/113792
PCT Pub. Date: Jul. 6, 2017

(65) Prior Publication Data
US 2018/0324735 A1    Nov. 8, 2018

(30) Foreign Application Priority Data

Dec. 31, 2015  (CN) .......................... 2015 1 1028118

(51) Int. Cl.
*H04L 12/801* (2013.01)
*H04L 12/24* (2006.01)
(Continued)

(52) U.S. Cl.
CPC ............. *H04W 60/00* (2013.01); *H04L 29/06* (2013.01); *H04L 63/0876* (2013.01);
(Continued)

(58) Field of Classification Search
CPC ..... H04W 60/00; H04W 84/20; H04W 48/16; H04W 76/10; H04W 4/80; H04W 12/08; H04L 63/0876; H04L 29/06
See application file for complete search history.

(56) References Cited

U.S. PATENT DOCUMENTS

2005/0078824 A1* 4/2005 Malinen .................. H04L 63/08
                                                            380/247
2009/0248794 A1* 10/2009 Helms .................. H04L 12/2861
                                                            709/203
(Continued)

FOREIGN PATENT DOCUMENTS

CN    101917216    12/2010
CN    103198400    7/2013
(Continued)

OTHER PUBLICATIONS

"International Search Report (Form PCT/ISA/210)", dated Oct. 28, 2016, with English translation thereof, pp. 1-6.

*Primary Examiner* — Brian S Roberts
*Assistant Examiner* — Abusayeed M Haque
(74) *Attorney, Agent, or Firm* — JCIPRNET

(57) ABSTRACT

The inventor provides a Bluetooth automatic connection method and a master device, slave device, and system for implementing Bluetooth automatic connection, solving the problem that manual selection and connection are needed in a scenario in which there are multiple Bluetooth devices. The present invention relates to implementation of connection between Bluetooth devices, and in particular, quick automatic connection of the Bluetooth devices. The method includes the following steps: enabling, by a first device, a Bluetooth function, to obtain Bluetooth device names in a communication range; determining, one by one, whether the Bluetooth device names in the communication range contain a specific character, and if any Bluetooth device name
(Continued)

contains the specific character, determining a Bluetooth device corresponding to the Bluetooth device name as a candidate Bluetooth device; connecting, by the first device, to a first server, where the first server stores validly registered Bluetooth device information; and according to the validly registered Bluetooth device information and names of candidate Bluetooth devices, determining whether there is a validly registered Bluetooth device in the candidate Bluetooth devices.

11 Claims, 2 Drawing Sheets

(51) Int. Cl.
| | |
|---|---|
| *H04W 84/18* | (2009.01) |
| *H04W 60/00* | (2009.01) |
| *H04W 76/10* | (2018.01) |
| *H04L 29/06* | (2006.01) |
| *H04W 8/22* | (2009.01) |
| *H04W 12/08* | (2009.01) |
| *H04W 12/00* | (2009.01) |
| *H04W 76/14* | (2018.01) |
| *H04W 8/00* | (2009.01) |
| *H04W 8/24* | (2009.01) |
| *H04W 48/16* | (2009.01) |
| *H04W 84/20* | (2009.01) |
| *G06Q 20/32* | (2012.01) |
| *H04W 4/80* | (2018.01) |

(52) U.S. Cl.
CPC ............ *H04W 8/005* (2013.01); *H04W 8/22* (2013.01); *H04W 8/24* (2013.01); *H04W 12/003* (2019.01); *H04W 12/08* (2013.01); *H04W 48/16* (2013.01); *H04W 76/10* (2018.02); *H04W 76/14* (2018.02); *H04W 84/20* (2013.01); *G06Q 20/32* (2013.01); *H04L 63/101* (2013.01); *H04W 4/80* (2018.02); *H04W 12/00512* (2019.01); *H04W 84/18* (2013.01)

(56) References Cited

U.S. PATENT DOCUMENTS

| | | | | |
|---|---|---|---|---|
| 2015/0304393 | A1* | 10/2015 | Kuraki | H04L 67/06 709/217 |
| 2016/0019547 | A1* | 1/2016 | Gurnani | G06Q 20/40145 705/44 |
| 2016/0021684 | A1* | 1/2016 | Lewis | H04L 63/0272 370/329 |
| 2017/0046037 | A1* | 2/2017 | Dand | G06F 3/0486 |
| 2017/0187536 | A1* | 6/2017 | Meriac | G06F 16/9566 |
| 2018/0012011 | A9* | 1/2018 | Spencer, III | G06F 21/73 |

FOREIGN PATENT DOCUMENTS

| | | |
|---|---|---|
| CN | 103560886 | 2/2014 |
| CN | 104320412 | 1/2015 |
| CN | 105611488 | 5/2016 |
| WO | 2014086762 | 6/2014 |

\* cited by examiner

BLUETOOTH AUTOMATIC CONNECTION METHOD, AND MASTER DEVICE, SLAVE DEVICE, AND SYSTEM

CROSS-REFERENCE TO RELATED APPLICATION

This application is a 371 application of the international PCT application serial no. PCT/CN2016/093139, filed on Aug. 3, 2016, which claims the priority benefit of China application no. 201511028118.6, filed on Dec. 31, 2015. The entirety of each of the abovementioned patent applications is hereby incorporated by reference herein and made a part of this specification.

BACKGROUND

Technical Field

The present invention relates to implementation of connection between Bluetooth devices, and in particular, quick automatic connection of the Bluetooth devices.

Description of Related Art

Bluetooth technologies are widely applied to current electronic products. Wearable devices such as mobile phone Bluetooth, Bluetooth earphones, and Bluetooth hand rings are relatively common. Bluetooth modules also begin to appear on mobile payment terminals. As a communication connection manner, Bluetooth completes information transmission between a mobile payment terminal (such as a POS machine) and a mobile communication terminal (such as a mobile phone).

In the process of implementing the present invention, the inventor finds that the prior art has the following problem: in a scenario of mobile payment, for example, at a cashier, each customer enables a Bluetooth function of a mobile phone for preparing to connect to a mobile payment terminal at the cashier. In this case, the customer searches for a Bluetooth device and will find a huge number of Bluetooth devices. Therefore, the customer needs to identify these Bluetooth devices one by one before determining which one is the mobile payment terminal at the cashier. This causes great inconvenience for mobile payment of the customer.

In addition, Bluetooth connection is a point-to-point connection manner. To connect a Bluetooth device in currently used Bluetooth connection to another Bluetooth device, the existing operation manner is as follows: a Bluetooth function is manually enabled, peripheral Bluetooth devices are manually searched for to find a Bluetooth device for Bluetooth connection, and information needed by pairing is manually input to complete the Bluetooth connection. According to the existing operation manner, it can be known that the operation is very complex and user experience is poor.

SUMMARY OF THE INVENTION

Simplified summaries of one or more aspects are provided below to provide basic understanding of these aspects. The summaries are not detailed overviews of all conceived aspects, and neither are intended to point out critical or decisive elements of all aspects, nor are intended to define the range of any aspect or all aspects. The only objective is to provide some concepts of one or more aspects in a simplified form as a preface of more specific descriptions that are subsequently provided.

The present invention provides a Bluetooth automatic connection method, including the following steps:

enabling, by a first device, a Bluetooth function, to obtain Bluetooth device names in a communication range;

determining, one by one, whether the Bluetooth device names in the communication range contain a specific character, and if any Bluetooth device name contains the specific character, determining a Bluetooth device corresponding to the Bluetooth device name as a candidate Bluetooth device;

connecting, by the first device, to a first server, where the first server stores validly registered Bluetooth device information; according to the validly registered Bluetooth device information and names of candidate Bluetooth devices, determining whether there is a validly registered Bluetooth device in the candidate Bluetooth devices;

if it is determined that there is a validly registered Bluetooth device in the candidate Bluetooth devices, connecting, by the first device, to the validly registered Bluetooth device.

Further, the step "according to the validly registered Bluetooth device information and names of candidate Bluetooth devices, determining whether there is a validly registered Bluetooth device in the candidate Bluetooth devices" is determining whether a name of a candidate Bluetooth device is SN or MAC of a validly registered Bluetooth device according to SN or MAC information of the validly registered Bluetooth device, the validly registered Bluetooth device information stored in the first server includes the SN or MAC information of the validly registered Bluetooth device.

Further, the validly registered Bluetooth device does not include: an audio input and output device, a character input and output device, and an image input and output device.

Further, a second server generates Bluetooth device information according to an order or a history order of a Bluetooth device, and sends the generated Bluetooth device information to the first server as initial validly registered Bluetooth device information; the first server receives and stores the validly registered Bluetooth device information.

Further, there are multiple first servers, and the first device accesses a corresponding first server according to identification information.

The inventor further provides a master device for implementing Bluetooth automatic connection, including a network module and a connection module, where the connection module is configured to enable a Bluetooth function, to obtain Bluetooth device names in a communication range;

the network module is configured to: connect to a first server, where the first server stores validly registered Bluetooth device information; the network module is configured to trigger determining, one by one, whether the Bluetooth device names in the communication range contain a specific character, and if any Bluetooth device name contains the specific character, determining a Bluetooth device corresponding to the Bluetooth device name as a candidate Bluetooth device; the network module is configured to: according to the validly registered Bluetooth device information and names of candidate Bluetooth devices, trigger determining whether there is a validly registered Bluetooth device in the candidate Bluetooth devices; and if determining that there is a validly registered Bluetooth device in the candidate Bluetooth devices, trigger the connection module to connect to the validly registered Bluetooth device.

Further, the determining module is configured to determine whether a name of a candidate Bluetooth device is SN or MAC of a validly registered Bluetooth device according to SN or MAC information of the validly registered Bluetooth device, and the validly registered Bluetooth device information stored in the first server includes the SN or MAC information of the validly registered Bluetooth device.

The inventor provides a slave device for implementing Bluetooth automatic connection, where SN or MAC information of the slave device is attached on a housing of the slave device.

The inventor further provides a system for implementing Bluetooth automatic connection, including a master device, a slave device, and a first server, where the first server includes a storage module, a network module, and a determining module;

the storage module is configured to store validly registered Bluetooth device information;

the network module is configured to communicate with a first device;

the determining module is configured to: determine, one by one, whether the Bluetooth device names in the communication range contain a specific character, and if any Bluetooth device name contains the specific character, determine a Bluetooth device corresponding to the Bluetooth device name as a candidate Bluetooth device; the determining module is configured to: according to the validly registered Bluetooth device information and names of candidate Bluetooth devices, determine whether there is a validly registered Bluetooth device in the candidate Bluetooth devices;

the master device is the foregoing master device for implementing Bluetooth automatic connection;

the slave device is the foregoing slave device for implementing Bluetooth automatic connection.

Different from the prior art, in the foregoing technical solutions, the first device can quickly find which Bluetooth devices in the current communication range are target Bluetooth devices according to the validly registered Bluetooth device information in the first server, so as to actively initiate a Bluetooth connection. A user does not need to determine and select a target for Bluetooth connection, facilitating connection to a specific Bluetooth device by the user.

In particular, in the mobile payment field, description is made by using an example that the first device is a mobile phone and the validly registered Bluetooth device is a POS machine. When performing payment at a cashier, a user needs only to click a corresponding app or trigger a corresponding function on the mobile phone, so that the mobile phone automatically enables a Bluetooth function, and obtains a list of Bluetooth devices in a current mobile Bluetooth communication range. Referring to FIG. 1, the mobile phone automatically performs S102: determining a candidate Bluetooth device, that is, determining whether Bluetooth device names in a communication range contain a specific character, and if any Bluetooth device name contains the specific character, determining a Bluetooth device corresponding to the Bluetooth device name as a candidate Bluetooth device; and S103: sending candidate Bluetooth device information (including a name of the candidate Bluetooth device) to a server, which determines whether there is a validly registered POS machine device in candidate Bluetooth devices. If it is determined through the foregoing steps that there is only one validly registered POS machine device in a current scenario, the mobile phone actively initiates a Bluetooth connection for connection to the POS machine device (step S205 or step S105), so as to prevent the user from identifying found Bluetooth devices one by one, and reduce manual operations of the user, thereby improving user experience. On the other hand, waiting time of other users at the cashier is also saved, thereby improving the flow speed. The first server verifies the name of the candidate Bluetooth device, and if the candidate Bluetooth device is validly registered POS machine, connection is performed, and if the candidate Bluetooth device is an invalid POS machine, connection is not performed, so as to reduce the probability of connecting to an invalid POS machine by a customer, thereby ensuring the transaction security of the customer.

The present invention is particularly applicable to the following scenario: there is another Bluetooth device in the communication range, but the validly registered Bluetooth device does not include: an audio input and output device, a character input and output device, and an image input and output device. The audio input and output device is an earphone, a sound box, or the like. The character input device is a keyboard, a key for inputting characters, or the like. The character output device, for example, is a display or an ink screen. The image input device is a camera, or the like. The image output device is a printer, a display, a projector, or the like. The validly registered Bluetooth device cannot press a key to actively select a Bluetooth device connected to the validly registered Bluetooth device. That is, the user of the validly registered Bluetooth device can learn Bluetooth pairing information of the validly registered Bluetooth device only from a third device, or can actively select a Bluetooth device docking with the validly registered Bluetooth device only by using the third device. Therefore, the validly registered Bluetooth device in the communication range is automatically filtered by using the method of the present invention, and an active connection is performed on the validly registered Bluetooth device, so as to facilitate quick connection between the first device and the validly registered Bluetooth device in the communication range.

To achieve the foregoing and related objectives, the one or more aspects include features that are sufficiently described in the following text and particularly pointed out in the appended claims. The following descriptions and accompanying drawings illustrate some descriptive features of the one or more aspects in detail. However, these features indicate only some of various manners of principles, that can be used, of various aspects, and the present disclosure is intended to cover all aspects of this type and equivalent aspects thereof.

BRIEF DESCRIPTION OF THE DRAWINGS

The disclosed aspects are described below with reference to the accompanying drawings, which are provided to describe rather than limit the disclosed aspects. Similar reference numerals in the accompanying drawings represent similar elements, where.

DESCRIPTION OF REFERENCE NUMERALS

10. Device (a device for implementing Bluetooth automatic connection)
110. Network module
120. Connection module

DETAILED DESCRIPTION OF THE EMBODIMENTS

To describe the technical content, structural features, objectives and effects achieved thereby of the technical solutions in detail, description is provided in detail below with reference to specific embodiments and accompanying drawings. In the following descriptions, a large number of specific details are illustrated for the purpose of explanation, to provide thorough understanding of one or more aspects. However, apparently, aspects of this type can also be practiced without these specific details. It can be understood that the terms in the present invention use, in priority, understandings thereof in the Bluetooth technical field.

List of Acronyms

SN: Serial Number.
MAC: Media Access Control or Medium Access Control, also referred to as a physical address or a hardware address.
VPN: Virtual Private Network, and the function thereof is: establishing a dedicated network on a public network, to perform encrypted communication.
HTTPS: full name: Hyper Text Transfer Protocol over Secure Socket Layer, an HTTP channel using security as a target, and in short, a secure version of HTTP.

Figure 1:
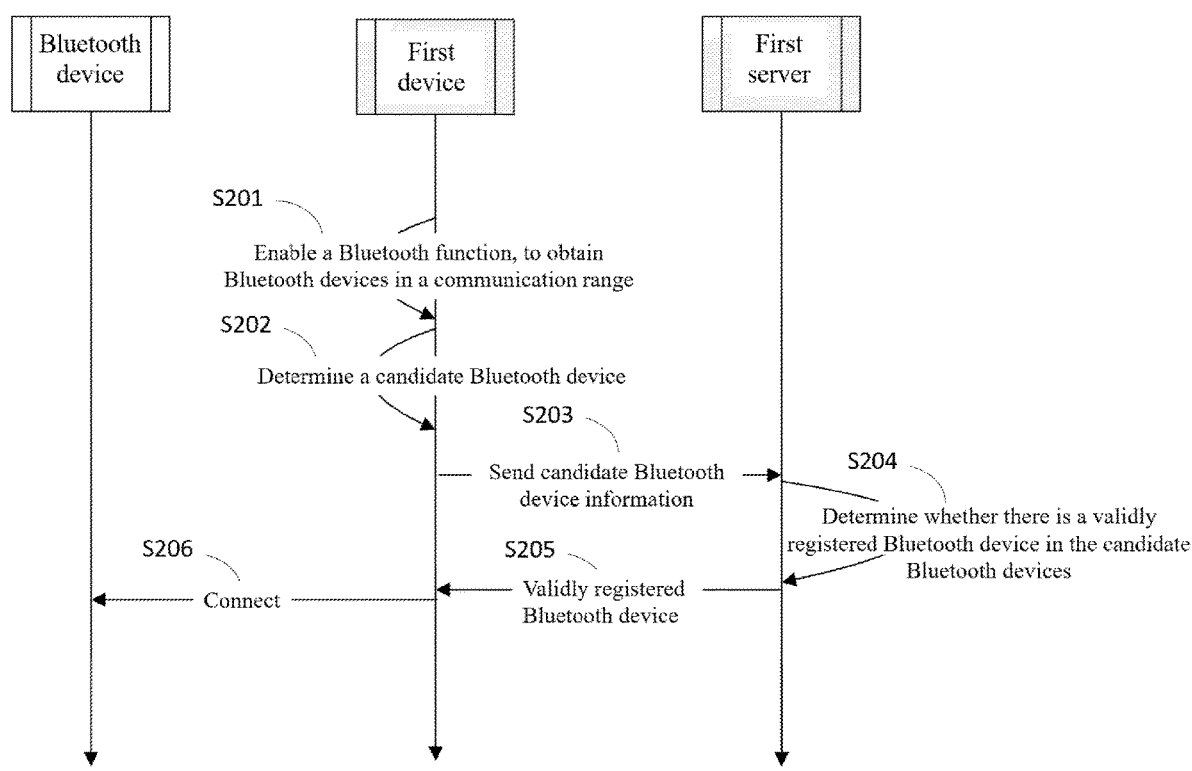
FIG. 1 is a specific implementation according to the present invention.

The terms in the present invention use, in priority, understandings thereof in the Bluetooth technical field. A Bluetooth device is a device having a Bluetooth hardware module. The name of a Bluetooth device is also referred to as a Bluetooth name, or a name in short, is formed by letters, numbers, or the like, and is a character string displayed in a Bluetooth device list during Bluetooth search. However, in this text, two Bluetooth devices being connected is that two Bluetooth devices establish a connection by using respective Bluetooth hardware modules, or may be referred to as Bluetooth connection or a connection in short. It can be understood that "A includes B" or "A comprises B" in this text may be that A is equal to B in some embodiments. It can be understood that in this text, the slave device and the master device are both devices having Bluetooth hardware modules. However, the master device and the slave device are named in this way only to distinguish between two entities. In some scenarios, the master device may also be used as the slave device. That is, in one scenario, a device A is used as a master device, and a device B is used as a slave device; but in another scenario, the device A may be used as the slave device, and the device B may be used as the master device. The present invention provides a Bluetooth automatic connection method, for quickly establishing a Bluetooth connection between a mobile communication terminal and a mobile payment terminal. The mobile communication terminal and the mobile payment terminal have Bluetooth hardware modules, and may also be referred to as Bluetooth devices. The mobile payment terminal may be POS machine. The mobile communication terminal may be a mobile phone. Referring to FIG. 1, the Bluetooth automatic connection method includes the following steps:

enabling, by a first device, a Bluetooth function, to obtain Bluetooth device names in a communication range;

connecting, by the first device, to a first server, where the first server stores validly registered Bluetooth device information;

determining, one by one, whether the Bluetooth device names in the communication range contain a specific character, and if any Bluetooth device name contains the specific character, determining a Bluetooth device corresponding to the Bluetooth device name as a candidate Bluetooth device;

according to the stored validly registered Bluetooth device information and names of candidate Bluetooth devices, determining whether there is a validly registered Bluetooth device in the candidate Bluetooth devices;

if it is determined that there is a validly registered Bluetooth device in the communication range, connecting, by the first device, to the Bluetooth device.

The first device is a device having a Bluetooth hardware module, and may be a mobile communication terminal such as a mobile phone. After enabling a Bluetooth function, the first device may search for surrounding Bluetooth devices, and connect to the Bluetooth devices. Search for surrounding Bluetooth devices may be manually triggered by a user, automatically performed periodically, or automatically performed by an application program having a payment function after the application program is opened. The Bluetooth devices that can be found are Bluetooth devices in the first device communication range. A Bluetooth device usually has two types of communication distances. One type of communication distance is 10 m and the other type of communication distance is 100 m. However, according to different processes and use scenarios, actual communication distances may also be different. A communication range is usually a range using the first device as a center and using a communication distance as a radius. Therefore, the communication distance determines the communication range.

After Bluetooth device names in the communication range are obtained by means of search, whether the Bluetooth device names in the communication range contain a specific character is determined one by one. The specific character is specified. For example, the specific character is "POS machine", and then a Bluetooth device whose name contains "POS machine" in the communication range is a candidate Bluetooth device. The specific character may also be null, that is, may be a space or there may be no character. If the specific character is a space or there is no character, Bluetooth devices in the communication range are all candidate Bluetooth devices. The specific character may also be data obtained with an encryption algorithm on MAC or SN. Preferably, a digital signature algorithm is used for encryption to obtain encrypted data. Then accordingly, whether a Bluetooth device name contains a specific character is determined. Accordingly, a character string, corresponding to the encrypted data, in the Bluetooth device name is taken out for decryption. If decryption succeeds, the corresponding device is a candidate Bluetooth device. The character string, corresponding to the encrypted data, in the Bluetooth device name is preset. For example, the name of the validly registered Bluetooth device is set to "6 bits of encrypted data+MAC", then the character string corresponding to the encrypted data is first 6 bits in the Bluetooth device name.

In some cases, the first server is a customer server, which stores Bluetooth device information owned by the customer or related Bluetooth device information. The Bluetooth device information is validly registered Bluetooth device information. A Bluetooth device whose Bluetooth device information is recorded in the validly registered Bluetooth device information is a validly registered Bluetooth device. Bluetooth device information stored in the first server may include MAC address or SN of the Bluetooth device, or another identifier uniquely corresponding to the Bluetooth device. Preferably, device information stored in the first server is generated by a manufacturer server (also referred to as a second server) according to a Bluetooth device purchased by a customer, and is sent to the first server in a secure communication manner after being generated. For example, in the mobile payment field, for a POS machine device having a Bluetooth hardware module, for a POS machine device owned by a customer, if the POS machine device is permanently damaged or phased out, a record of the device is accordingly deleted in a customer server, or the device is marked to an invalid state. Device information of the POS machine includes at least SN or MAC, and may further include one or more of the followings: SN, MAC, ID, certificate, production date, customer name, customer ID, and the like. The validly registered Bluetooth device information is initialized by using a second server, thereby reducing the workload of managing validly registered Bluetooth device information by a customer, as well as ensuring the accuracy and effectiveness of the initial validly registered Bluetooth device information.

In a process of using a Bluetooth device by a customer, if the Bluetooth device is damaged, the customer accordingly modifies Bluetooth device information on a customer server. For example, in the mobile payment field, for a POS machine device having a Bluetooth hardware module, for a POS machine device owned by a customer, if the POS machine device is permanently damaged or phased out, a record of the device is accordingly deleted in a customer server, or the device is marked as an invalid state. If the POS machine device is in a maintained state or a to-be-maintained state, the POS machine device is marked as temporarily unavailable; and otherwise, is marked as normal or other. POS machine device information and a set that are identified as normal in the customer server is validly registered Bluetooth device information. By means of self-management of the customer, and modification and update of the POS machine device information in the customer server, lawbreakers are prevented from faking a normally used POS machine device by using a discarded POS machine device or a POS machine device on which repair reporting is performed.

Specific steps of determining whether there is a validly registered Bluetooth device in candidate Bluetooth devices according to validly registered Bluetooth device information in a first server are:

traversing names of the candidate Bluetooth devices one by one; querying validly registered Bluetooth device information stored in the first server by using a Bluetooth device name as a query condition; and if the validly registered Bluetooth device information includes the Bluetooth device name, determining a Bluetooth device corresponding to the Bluetooth device name as the validly registered Bluetooth device. If there is only one Bluetooth device being the validly registered Bluetooth device in a use scenario, the first device actively initiates a Bluetooth connection for connection to the Bluetooth device. If there are multiple Bluetooth devices being the validly registered Bluetooth devices in the use scenario, preferably, these validly registered Bluetooth devices are ranked according to the strength of Bluetooth signals, and the first device actively connects to a validly registered Bluetooth device having a strongest signal in the communication range. The validly registered Bluetooth devices in the communication range may also be displayed on the first device in a manner of a list, and an operator of the first device determines which Bluetooth device is to be connected.

According to the validly registered Bluetooth device information in the first server and Bluetooth device names in the communication range, the first device can quickly find which Bluetooth devices in the current communication range are target Bluetooth devices, so as to actively initiate a Bluetooth connection. A user does not need to determine and select a target for Bluetooth connection, facilitating connection to a specific Bluetooth device by the user.

In particular, in the mobile payment field, description is made by using an example that the first device is a mobile phone and the validly registered Bluetooth device is a POS machine. When performing payment at a cashier, a user needs only to click a corresponding app or trigger a corresponding function on the mobile phone, so that the mobile phone automatically enables a Bluetooth function, and obtains a list of Bluetooth devices in a current mobile Bluetooth communication range (step S201). Referring to FIG. 1, the mobile phone automatically determines a candidate Bluetooth device, that is, determines whether Bluetooth device names in a communication range contain a specific character, and if any Bluetooth device name contains the specific character, determines a Bluetooth device corresponding to the Bluetooth device name as a candidate Bluetooth device (step S202); and sends candidate Bluetooth device information (including a name of the candidate Bluetooth device) to a server (step S203), which determines whether there is a validly registered POS machine device in candidate Bluetooth devices (step S204). If it is determined through the foregoing steps that there is only one validly registered POS machine device in a current scenario, the mobile phone actively initiates a Bluetooth connection (step S205) for connection to the POS machine device (step S206), so as to prevent the user from identifying found Bluetooth devices one by one, and reduce manual operations of the user, thereby improving user experience. On the other hand, waiting time of other users at the cashier is also saved, thereby improving the flow speed. The first server verifies the name of the candidate Bluetooth device, and if the candidate Bluetooth device is validly registered POS machine, connection is performed, and if the candidate Bluetooth device is an invalid POS machine, connection is not performed, so as to reduce the probability of connecting to an invalid POS machine by a customer, thereby ensuring the transaction security of the customer.

Preferably, the first server stores SN or MAC information of a validly registered POS machine, and sets that the Bluetooth device name of the validly registered Bluetooth device includes the SN or MAC thereof. By using a POS machine as an example, the first server stores SN or MAC information of a validly registered POS machine (a POS machine having Bluetooth) as the validly registered Bluetooth device information. A POS machine in a cash register uses SN or MAC information thereof as a part of the Bluetooth device name, and then "determining whether there is a validly registered Bluetooth device in candidate Bluetooth devices according to stored validly registered Bluetooth device information" is determining whether there is a validly registered POS machine in candidate Bluetooth devices according to SN or MAC information, stored in the first server, of a validly registered POS machine, and the names of the candidate Bluetooth devices. The Bluetooth device name of a POS machine may be initialized to include SN or MAC thereof when leaving the factory, and then a customer stores information of a POS machine belonging to the customer or of related POS machines into a first server corresponding to the customer as validly registered Bluetooth device information. If the POS belonging to the customer is phased out, returned for repair, or lost, the customer only needs to delete corresponding POS machine information in validly registered POS machine information in the first server without affecting automatic connections of other POS machines of the customer. It can be understood that in the foregoing solution, the Bluetooth device name of the POS machine may also be set to include SN or MAC. For example, the Bluetooth device name is: "specific character+MAC", "MAC+SN", "specific character+SN" or the like. Then, accordingly, if it is determined that Bluetooth device names in the communication range include SN or MAC information of a validly registered POS machine, the Bluetooth device is a validly registered POS machine.

The present invention is particularly applicable to the following scenario: there is another Bluetooth device in the communication range, but the validly registered Bluetooth device does not include: an audio input and output device, a character input and output device, and an image input and output device. The audio input and output device is an earphone, a sound box, or the like. The character input device is a keyboard, a key for inputting characters, or the like. The character output device, for example, is a display or an ink screen. The image input device is a camera, or the like. The image output device is a printer, a display, a projector, or the like. The validly registered Bluetooth device cannot press a key to actively select a Bluetooth device connected to the validly registered Bluetooth device. That is, the user of the validly registered Bluetooth device can learn Bluetooth pairing information of the validly registered Bluetooth device only from a third device, or can actively select a Bluetooth device docking with the validly registered Bluetooth device only by using the third device. Therefore, the validly registered Bluetooth device in the communication range is automatically filtered by using the method of the present invention, and an active connection is performed on the validly registered Bluetooth device, so as to facilitate quick connection between the first device and the validly registered Bluetooth device in the communication range.

The display output device is a device that can output images or characters. The Bluetooth pairing information is information that is obtained or sent when Bluetooth pairing is not performed, such as the name, MAC, or SN of the master device or the slave device. The third device is physically separable from the first device, and may not be sold as a combined product. For example, the third device may be a mouse, a keyboard or a smartphone.

Some Bluetooth devices can directly establish Bluetooth connections without inputting pin response by the first device. Other Bluetooth devices allow the first device to establish a Bluetooth connection thereto only when the first device inputs a corresponding pin. Therefore, in some embodiments, the first server further stores a pin code of the validly registered Bluetooth device. Before the first device initiates an active Bluetooth connection, a pin code of the to-be-connected Bluetooth device is further obtained from the first server. The to-be-connected Bluetooth device is the validly registered Bluetooth device in the communication range. After the first device initiates the Bluetooth connection to the validly registered Bluetooth device, the first device automatically uses the pin response in the process of establishing the Bluetooth connection. By using the method, security of communication between the first device and the to-be-connected Bluetooth device can be ensured, and it can be ensured that the to-be-connected Bluetooth device is not maliciously occupied by other Bluetooth devices, so that the connection between the first device and the to-be-connected Bluetooth device is not affected.

For different customers, Bluetooth devices respectively owned by the customers are usually different. The Bluetooth device information is respectively stored in different first servers according to classification of customers. That is, there are multiple first servers. Different first servers store validly registered Bluetooth device information respectively corresponding to customers thereof. It can be understood that the server may be a virtual server. The first device accesses a corresponding first server according to identification information, which may be a website or a port. The identification information may also be an identifier for distinguishing between customers, such as a customer name, a customer ID, or another symbol uniquely corresponding to the customer name or the customer ID. By using the identifiers, the first server corresponding to the customer can be accessed or necessary information, defined by the access customer, of the first server can be obtained. Different customers correspond to different first servers, thereby facilitating management of Bluetooth devices belonging to the customer by the customer. Automatic connection to a corresponding Bluetooth device is selected according to a current use scenario of the user.

For example, at a package delivery station simultaneously surrogating multiple express services, the package delivery station has multiple POS machines, which respectively correspond to different express services. A consignee only needs to open an app of an express service on a mobile phone during taking the delivery or payment. Then, the app on the mobile phone of the consignee accesses the first server corresponding to the express service according to an address set in the app, and obtains a validly registered Bluetooth device for the express service (a POS machine of the express service) in a communication range of the mobile phone by using the method, and then initiates a Bluetooth connection, so as to avoid the problem of manual Bluetooth connection by the consignee, and accurately connect to the target POS machine, thereby improving user experience.

Figure 2:
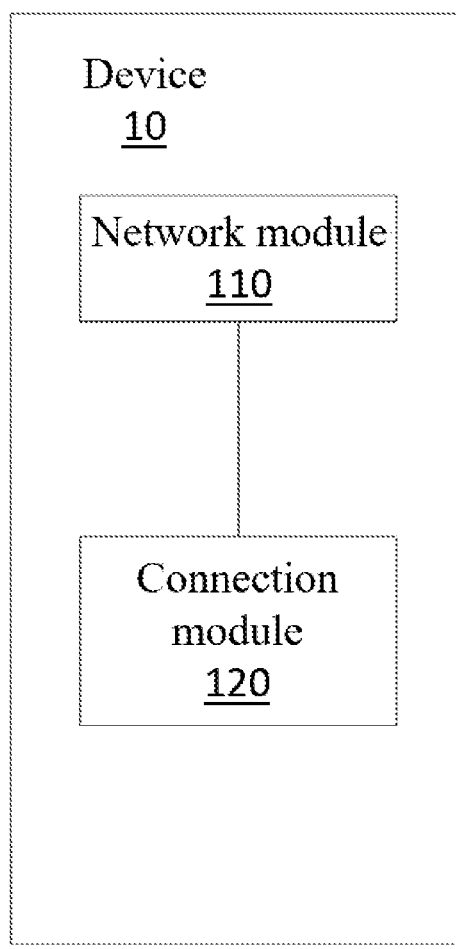
FIG. 2 is a schematic diagram of modules of a device for implementing Bluetooth automatic connection according to the specific implementation.

Referring to FIG. 2, the inventor further provides a master device for implementing Bluetooth automatic connection, including a network module 110 and a connection module 120;

the connection module is configured to enable a Bluetooth function, to obtain Bluetooth devices in a communication range;

the network module the network module is configured to: connect to a first server, where the first server stores validly registered Bluetooth device information; the network module is configured to trigger determining, one by one, whether the Bluetooth device names in the communication range contain a specific character, and if any Bluetooth device name contains the specific character, determining a Bluetooth device corresponding to the Bluetooth device name as a candidate Bluetooth device; the network module is configured to: according to the validly registered Bluetooth device information and names of candidate Bluetooth devices, trigger determining whether there is a validly registered Bluetooth device in the candidate Bluetooth devices; and if determining that there is a validly registered Bluetooth device in the candidate Bluetooth devices, trigger the connection module to connect to the validly registered Bluetooth device.

Further, the determining module is configured to determine whether a name of a candidate Bluetooth device is SN or MAC of a validly registered Bluetooth device according to SN or MAC information of the validly registered Bluetooth device, and the validly registered Bluetooth device information stored in the first server includes the SN or MAC information of the validly registered Bluetooth device.

The inventor provides a slave device for implementing Bluetooth automatic connection, where information of SN or MAC of the slave device is attached on a housing of the slave device.

The inventor further provides a system for implementing Bluetooth automatic connection, including a master device, a slave device, and a first server, where the first server includes a storage module, a network module, and a determining module;

the storage module is configured to store validly registered Bluetooth device information;

the network module is configured to communicate with a first device;

the determining module is configured to: determine, one by one, whether the Bluetooth device names in the communication range contain a specific character, and if any Bluetooth device name contains the specific character, determine a Bluetooth device corresponding to the Bluetooth device name as a candidate Bluetooth device; the determining module is configured to: according to the validly registered Bluetooth device information and names of candidate Bluetooth devices, determine whether there is a validly registered Bluetooth device in the candidate Bluetooth devices;

the master device is the foregoing master device for implementing Bluetooth automatic connection;

the slave device is the foregoing slave device for implementing Bluetooth automatic connection.

It should be noted that the relational terms herein such as first and second are used only to differentiate an entity or operation from another entity or operation, and do not require or imply any actual relationship or sequence between these entities or operations. In addition, term "comprise", "include", or any other variant thereof aims to cover non-exclusive "include", so that a process, method, object, or terminal device that comprises a series of elements not only comprises the elements, but also comprises other elements that are not definitely listed, or further comprises inherent elements of the process, method, object, or terminal device. In a case in which there are no more limitations, an element defined by the sentence "comprise . . . " or "include . . . " does not exclude the case in which other elements further exist in a process, method, or object, or terminal device that comprises the element. In addition, in this text, "greater than", "less than", "exceed", and the like are understood as not including the number. "More", "fewer", "within", and the like are understood as including the number.

A person skilled in the art should understand that the foregoing embodiments may provide a method, an apparatus, a device, or a computer program product. These embodiments may use forms of full hardware embodiments, full software embodiments, or embodiments of a combination of software and hardware aspects. All or some of the steps in the methods involved in the foregoing embodiments may be implemented by using a program instructing relevant hardware. The program may be stored in a computer device readable storage medium for performing all or some of the steps of the methods in the foregoing embodiments. The computer device includes but is not limited to: a personal computer, a server, a general-purpose computer, a dedicated computer, a network device, an embedded device, a programmable device, an intelligent mobile terminal, an intelligent home device, a wearable intelligent device, an in-vehicle intelligent device, and the like. The storage medium includes but is not limited to: a RAM, a ROM, a magnetic disk, a magnetic tape, an optical disc, a flash memory, a USB flash drive, a removable hard disk, a memory card, a memory stick, network server storage, network cloud storage, and the like.

The foregoing embodiments are described with reference to flowcharts and/or block diagrams of the method, the device (the system), and the computer program product in the embodiments. It should be understood that computer program instructions may be used for implementing each process and/or each block in the flowcharts and/or the block diagrams and a combination of a process and/or a block in the flowcharts and/or the block diagrams. These computer program instructions may be provided to a computer of a computer device to generate a machine, so that instructions executed by the processor of the computer device generate an apparatus configured to implement specific functions in one or more processes in the flowcharts and/or in one or more blocks in the block diagrams.

These computer program instructions may further be stored in a computer device readable memory that can instruct the computer device to work in a specific manner, so that the instructions stored in the computer device readable memory generate an artifact that includes an instruction apparatus. The instruction apparatus implements specific functions in one or more processes in the flowcharts and/or in one or more blocks in the block diagrams.

These computer program instructions may further be loaded onto a computer device, so that a series of operations and steps are performed on the computer device, thereby generating computer-implemented processing. Therefore, the instructions executed on the computer device provide steps for implementing specific functions in one or more processes in the flowcharts and/or in one or more blocks in the block diagrams.

Although the foregoing embodiments are described, once a person skilled in the art learns a basic inventive concept, the person skilled in the art may make additional changes and modifications to these embodiments. Therefore, the foregoing descriptions are merely embodiments of the present invention, and are not intended to limit the patent protection scope of the present invention. Any equivalent structural change or any equivalent process change that is made by using the contents of the description and the accompanying drawings of the present invention is directly or indirectly applied to technical fields related thereto, and likewise falls into the patent protection scope of the present invention.

What is claimed is:

1. A Bluetooth automatic connection method, comprising the following steps:

enabling, by a first device, a Bluetooth function, to obtain Bluetooth device names in a communication range;

determining, one by one, whether the Bluetooth device names in the communication range contain a specific character, and if any Bluetooth device name contains the specific character, determining a Bluetooth device corresponding to the Bluetooth device name as a candidate Bluetooth device;

connecting, by the first device, to a first server, wherein the first server stores validly registered Bluetooth device information; according to the validly registered Bluetooth device information and names of candidate Bluetooth devices, determining whether there is a validly registered Bluetooth device in the candidate Bluetooth devices; and if it is determined that there are validly registered Bluetooth devices in the candidate Bluetooth devices, the validly registered Bluetooth devices are ranked according to the strength of Bluetooth signals, connecting, by the first device, to the validly registered Bluetooth device having a strongest Bluetooth signal in the communication range.

2. The Bluetooth automatic connection method according to claim 1, wherein the step "according to the validly registered Bluetooth device information and names of candidate Bluetooth devices, determining whether there is a validly registered Bluetooth device in the candidate Bluetooth devices" is determining whether a name of a candidate Bluetooth device is serial number (SN) or media access control (MAC) of the validly registered Bluetooth device according to SN or MAC information of the validly registered Bluetooth device; and the validly registered Bluetooth device information stored in the first server comprises the SN or MAC information of the validly registered Bluetooth device.

3. The Bluetooth automatic connection method according to claim 2, wherein the validly registered Bluetooth device does not comprise: an audio input and output device, a character input and output device, and an image input and output device.

4. The Bluetooth automatic connection method according to claim 1, wherein the validly registered Bluetooth device does not comprise: an audio input and output device, a character input and output device, and an image input and output device.

5. The Bluetooth automatic connection method according to claim 1, wherein a second server generate Bluetooth device information according to an order or a history order of a Bluetooth device, and sends the generated Bluetooth device information to the first server as initial validly registered Bluetooth device information; and the first server receives and stores the validly registered Bluetooth device information.

6. The Bluetooth automatic connection method according to claim 1, wherein there are multiple first servers, and the first device accesses a corresponding first server according to identification information.

7. A master device for implementing Bluetooth automatic connection, comprising a network circuit and a connection circuit, the connection circuit is configured to enable a Bluetooth function, to obtain Bluetooth devices in a communication range;

the network circuit is configured to connect to a first server, wherein the first server stores validly registered Bluetooth device information; the network circuit is configured to trigger determining, one by one, whether the Bluetooth device names in the communication range contain a specific character, and if any Bluetooth device name contains the specific character, determining a Bluetooth device corresponding to the Bluetooth device name as a candidate Bluetooth device; the network circuit is configured to according to the validly registered Bluetooth device information and names of candidate Bluetooth devices, trigger determining whether there is a validly registered Bluetooth device in the candidate Bluetooth devices; and if it is determined that there are validly registered Bluetooth devices in the candidate Bluetooth devices, ranking the validly registered Bluetooth devices according to the strength of Bluetooth signals, trigger the connection circuit to connect to the validly registered Bluetooth device having a strongest Bluetooth signal in the communication range.

8. The master device for implementing Bluetooth automatic connection according to claim 7, wherein a determining circuit is configured to determine whether a name of a candidate Bluetooth device is serial number (SN) or media access control (MAC) of a validly registered Bluetooth device according to SN or MAC information of the validly registered Bluetooth device, and the validly registered Bluetooth device information stored in the first server comprises the SN or MAC information of the validly registered Bluetooth device.

9. A slave device for implementing Bluetooth automatic connection according to claim 8, wherein information of serial number (SN) or media access control (MAC) of the slave device is attached on a housing of the slave device.

10. A system for implementing Bluetooth automatic connection, comprising a master device, a slave device, and a first server, the first server comprises a storage circuit a network circuit, and a determining circuit;

the storage circuit is configured to store validly registered Bluetooth device information;

the network circuit is configured to communicate with a first device;

the determining circuit is configured to determine, one by one, whether the Bluetooth device names in the communication range contain a specific character, and if any Bluetooth device name contains the specific character, determine a Bluetooth device corresponding to the Bluetooth device name as a candidate Bluetooth device; the determining circuit is configured to according to the validly registered Bluetooth device information and names of candidate Bluetooth devices, determine whether there is a validly registered Bluetooth device in the candidate Bluetooth devices;

the master device is the master device for implementing Bluetooth automatic connection according to claim 7; and the slave device is the slave device for implementing Bluetooth automatic connection, wherein information of serial number (SN) or media access control (MAC) of the slave device is attached on a housing of the slave device.

11. A system for implementing Bluetooth automatic connection, comprising a master device, a slave device, and a first server, the first server comprises a storage circuit a network circuit, and a determining circuit:

the storage circuit is configured to store validly registered Bluetooth device information;

the network circuit is configured to communicate with a first device;

the determining circuit is configured to: determine, one by one, whether the Bluetooth device names in the communication range contain a specific character, and if any Bluetooth device name contains the specific character, determine a Bluetooth device corresponding to the Bluetooth device name as a candidate Bluetooth device; the determining circuit is configured to: according to the validly registered Bluetooth device information and names of candidate Bluetooth devices, determine whether there is a validly registered Bluetooth device in the candidate Bluetooth devices;

the master device is the master device for implementing Bluetooth automatic connection according to claim 8; and the slave device is the slave device for implementing Bluetooth automatic connection, wherein information of serial number (SN) or media access control (MAC) of the slave device is attached on a housing of the slave device.

\* \* \* \* \*